F. ROBBINS.
APPARATUS FOR REMOVING STONES FROM FRUIT.
APPLICATION FILED APR. 7, 1920.
1,357,004. Patented Oct. 26, 1920.
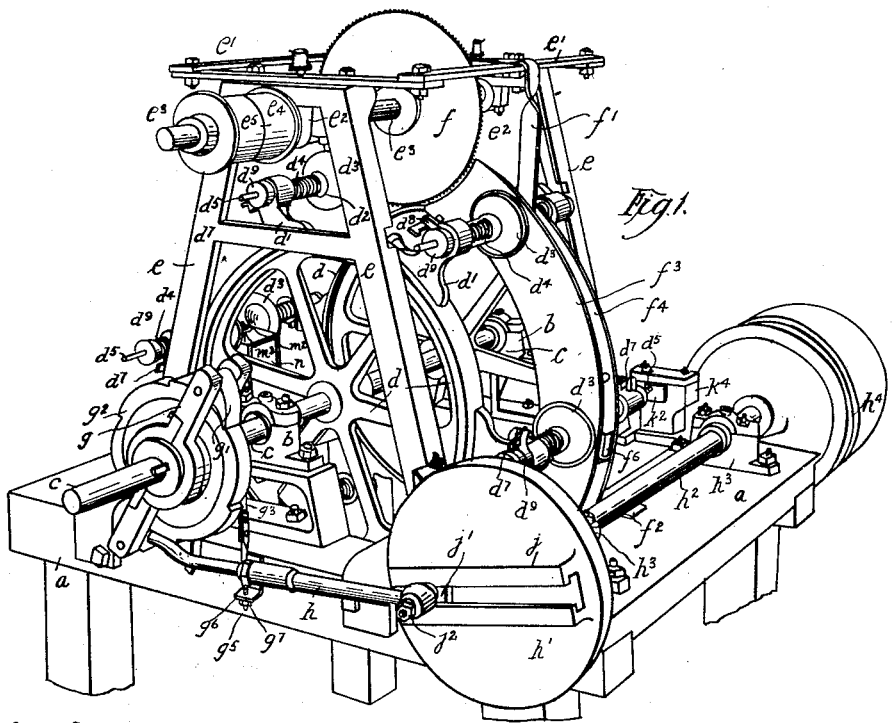
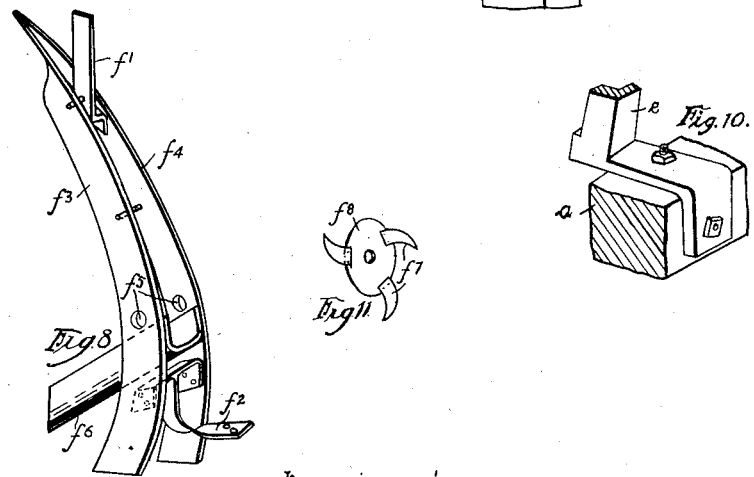
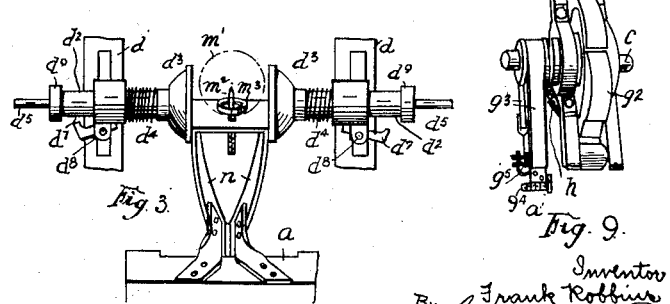
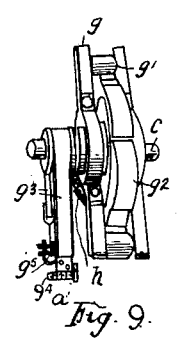

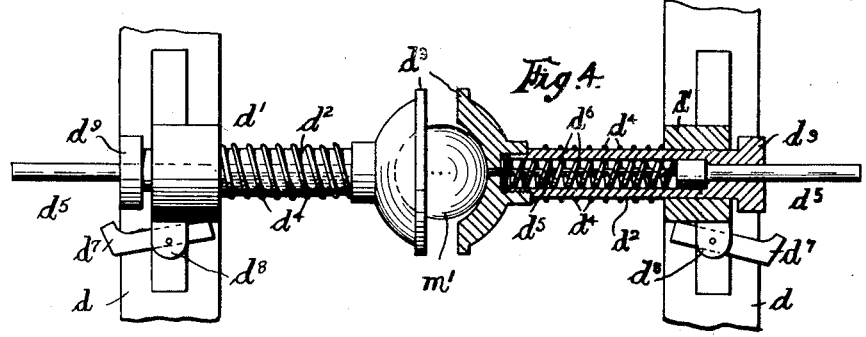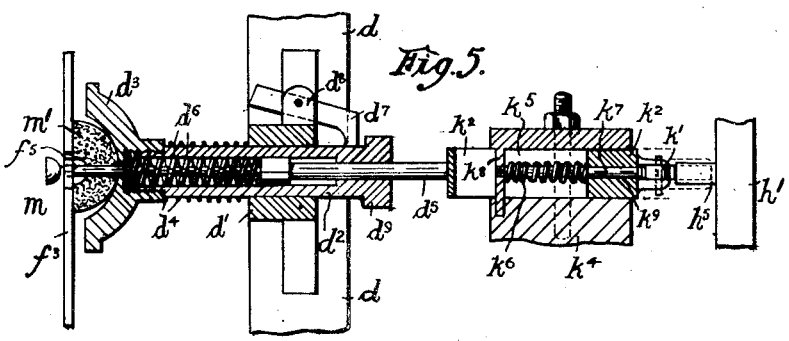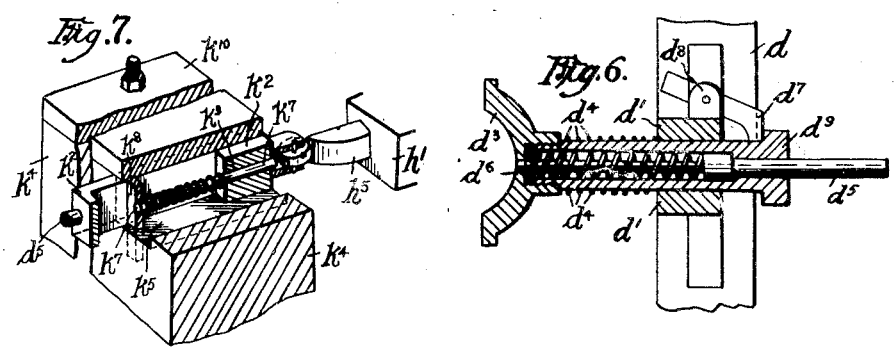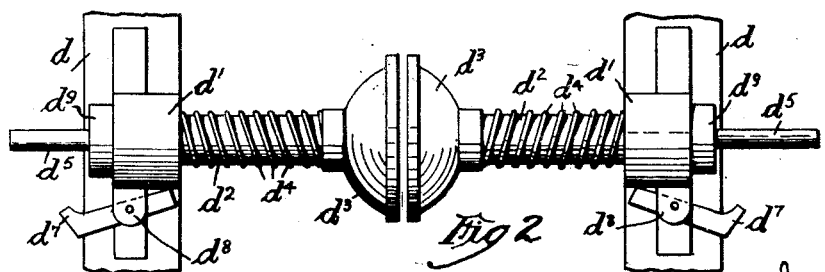

UNITED STATES PATENT OFFICE.

FRANK ROBBINS, OF CLIFTON HILL, VICTORIA, AUSTRALIA.

APPARATUS FOR REMOVING STONES FROM FRUIT.

1,357,004.  Specification of Letters Patent.  Patented Oct. 26, 1920.

Application filed April 7, 1920. Serial No. 371,818.

*To all whom it may concern:*

Be it known that I, FRANK ROBBINS, a subject of the King of Great Britain, residing at No. 94, Ramsden street, Clifton Hill, in the State of Victoria, Australia, have invented certain new and useful Improvements in Apparatus for Removing Stones from Fruit; and I do declare the following to be a full, clear, and exact description of the invention, such as will enable others skilled in the art to which it appertains to make and use the same.

This invention has been devised to provide an apparatus for removing the stones from fruit. The fruit to be treated is preferably of a solid or firm character. In describing my invention, I shall refer to the stoning of peaches, of the kind commonly used for canning purposes. The stones, at present, are mostly removed by hand, necessitating the employment of a large staff, and the operation is slow, tedious, and expensive, adding largely to the cost of manufacture. My invention overcomes the foregoing difficulties in a simple and expeditious manner.

In order that my invention may the more easily be understood, reference will be made to the accompanying sheets of drawings in which—

Figure 1 is a general view of apparatus embodied in my invention.

Fig. 2 is a front view (drawn to a larger scale) of apparatus for holding the fruit. The parts are shown in a position prior to being extended for receiving the fruit.

Fig. 3 is a sectional view showing the fruit holding apparatus extended by the guide and fruit holder as hereinafter described.

Fig. 4 is a part sectional view ( drawn to a larger scale) of the fruit holding apparatus and illustrates the sliding tubes, with bell mouths or cups as hereinafter described, the fruit is shown gripped within the bell mouths or cups prior to the fruit meeting the saw or cutting medium.

Fig. 5 shows a further step in the operation of the fruit holding apparatus. A cam is shown having engaged a sliding knocker which in turn has operated a pusher shown extended through half of the fruit the halved stone having been removed therefrom and pushed through a slot after which it falls into a chute as hereinafter described; the oppositely disposed identical apparatus (not shown) is operated in a similar manner.

Fig. 6 shows the extended position of the parts of each half of the fruit-holding apparatus after the half of the fruit has fallen, the sliding tube being held in such position by a gravity pawl hereinafter described.

Fig. 7 is a sectional view of a sliding knocker hereinafter described; the knocker is shown near the end of its engagement with a cam the knocker having been pushed inwardly against the tension of its internal spring; the inner end of such knocker is shown in contact with the end of a pusher for the purposes hereinafter described.

Fig. 8 illustrates V-shaped director plates hereinafter referred to.

Fig. 9 shows adjustable gear for imparting an intermittent motion to the main shaft and a band brake is also shown such brake controlling the movement of said shaft during a certain period of the rotary movement of the wheels.

Fig. 10 shows the manner of attaching the standards to the frame hereinafter referred to while Fig. 11 illustrates a modified form of cutting medium hereinafter described.

In the accompanying drawings $a$ is a framing with bearings $b$ for a cross shaft $c$ upon which are mounted two correspondingly shaped parallel wheels $d$. Integral with, and on the periphery of such wheels are brackets $d'$ disposed at desired intervals apart, while mounted in each bracket and projecting inwardly therefrom is a horizontal, movable, or sliding tube $d^2$ with cups $d^3$ and exterior tension coil spring $d^4$. Through the center of the tube $d^2$ a plunger or pusher $d^5$ operates horizontally against the tension of an internal spring $d^6$, the function of the pusher being hereinafter described. To control the pre-determined horizontal movement of the sliding tube $d^2$ during a portion of the rotary movement of the wheels a gravity pawl $d^7$ is employed; such pawl is mounted on arms $d^8$ integral with each bracket $d'$. The pawl $d^7$ engages when required the shoulder $d^9$ of the sliding tube $d^2$ and in doing so the tube will be retained for a required period in an outwardly extended position against the tension of the coil spring $d^4$.

Suitably mounted on the frame $a$ are standards $e$ braced at their tops by bars $e'$. At the top of the standards $e$ bearings $e^2$ are provided in which is mounted a shaft $e^3$ with fast and loose pulleys $e^4$ and $e^5$, upon which is fixed (above the wheels $d$ but in a position to allow the lower edge to lie between and in the center of same) a high speed circular saw $f$. At the rear of the saw $f$ is a V-shaped director supported by brackets $f'$ and $f^2$ the sides $f^3$ and $f^4$ of such director inclining outwardly toward the rear of the machine, and both sides are provided at a convenient position with an exit slot $f^5$ of a required configuration, under which a discharge chute $f^6$ is disposed.

The motion of the wheels $d$ is intermittent to permit the feed of the fruit, and also other functions as hereinafter described. Motion is imparted to the wheels by side link bars $g$ mounted on the shaft $c$, said bars $g$ carrying a pawl $g'$ which engages a toothed wheel $g^2$ mounted between the bars $g$ on the cross shaft $c$. To stop the rotary motion of the shaft $c$ and with it the wheels $d$, while the pawl $g'$ is making its rearward movement prior to engaging the respective tooth of the wheel $g^2$, a brake is employed consisting of a band $g^3$ one end of which is fixed to a bolt $g^4$ while the other end $g^5$ is threaded and passes through a plate $g^6$ which the adjusting nut $g^7$ on the end $g^5$ is in contact with. The holding pressure of the band $g^3$ is adjusted by the nut $g^7$ so that it will be less than the propelling power of the gear hereinbefore described, thus the shaft $c$ and wheels $d$ will stop at pre-determined periods of their rotary movement but will continue to rotate when required.

The bars $g$ receive their rotary motion from an adjustable crank slide rod $h$ which is actuated by the rotary movement of the wheel $h'$ on the driving shaft $h^2$ mounted in bearings $h^3$ fixed on the frame $a$ the shaft $h^2$ being rotated by the pulley wheel $h^4$ operated by belting (not shown). To permit the stroke of the crank slide rod $h$ being regulated, and so control the intermittent motion or speed of the wheels $d$, a guide $j$ is provided on the side of wheel $h'$ for a movable block $j'$ to which the end of the rod $h$ is connected and held in its set position by nut $j^2$.

On the interior, near the periphery of the driving wheel $h'$ and pulley wheel $h^4$, is a projection cam $h^5$ (see Fig. 5) which in the rotary movement of the wheels $h'$ and $h^4$ comes at a pre-determined time into contact with a wheel $k'$ of a horizontally sliding knocker $k^2$, operating in a slot $k^3$ in a block $k^4$ secured to the frame $a$ hereinbefore referred to. The knocker $k^2$ is provided with a longitudinal slot $k^5$ containing a coil spring $k^6$ mounted on a pin $k^7$, one end being screwed into the stationary bar $k^8$ integral with the cover $k^{10}$ of the block $k^4$ while the other end is disposed in a slot $k^9$ at the outer end of the knocker. As the knocker $k^2$ makes its inward movement the spring $k^6$ is compressed and on the cam $h$ becoming disengaged from the knocker the tension of the spring $k^6$ causes the knocker $k^2$ to move outwardly to a position to again meet the cam $h$ as it makes its rotary movement. As the knocker $k^2$ makes its inward movement it strikes the head of the plunger or pusher $d^5$ within the sliding tube $d^2$, the inner end of the plunger or pusher $d^5$ being forced inwardly and in contact with the half of the stone $m$ of the fruit, the latter being pushed from its seat in the fruit $m'$ as hereinafter described.

When feeding the machine with fruit for treatment, the fruit $m'$ is placed on the pin $m^2$ of the stationary cup $m^3$ (see Fig. 3) disposed on the top of a V-shaped guide $n$ set in position corresponding with that of the center of the saw $f$. As the wheels $d$ rotate the cups $d^3$ of each of the sliding or movable tubes $d^2$ will come into contact with the upwardly inclined sides of the guide $n$ and during the rotary movement of the wheels $d$ the cups $d^3$ are carried upwardly simultaneously being forced outwardly against the tension of the coil spring $d^4$ (see Fig. 3).

Immediately the cups $d^3$ of each oppositely disposed tube $d^2$ pass over the top of the guide and holder $n$, the tension of the spring $d^4$ is released, forcing them inwardly, i. e., toward each other, at the same time the wheels $d$ stop for a moment, the actuating gear hereinbefore described as before stated being adjusted for that purpose.

Simultaneously with the inward movement of the tubes $d^2$ the fruit $m'$ is caught between the cups and held firmly in position (see Fig. 4) its center corresponding with that of the saw $f$. As the wheels $d$ continue their intermittent rotary movement, the fruit $m'$ shortly comes into contact with a high speed circular saw $f$ or other cutting medium such as curved blades $f^7$ fixed on a disk $f^8$ (see Fig. 11). As the cutting medium rotates it cuts through the center of the fruit $m'$, including the stone $m$, and in doing so, halves the fruit.

As the respective cups $d^3$ leave the circular saw $f$ each half of the fruit comes into contact with the sides $f^3$ and $f^4$ at the pointed end of the V-shaped director, and, as the wheels $d$ continue their intermittent rotary movement, each half of the fruit and the respective cups $d^3$ are carried downwardly and in contact with the sides $f^3$ and $f^4$ of the director. Simultaneously the tubes $d^2$ are gradually forced inwardly by the inclined sides $f^3$ and $f^4$ of the director against the tension of the spring $d^4$. As each respective cup $d^3$ reaches a central position in front of the slot $f^5$ in the sides $f^3$ and $f^4$, the wheels again stop as before described; simultaneously the cams $h^5$ come into contact with their respective sliding knocker $h^2$ and as the wheels $h'$ and $h^4$ continue to rotate each knocker is forced inwardly as before described and in doing so strikes the head of the respective plunger or pusher $d^5$, the inner end of which in turn is pushed through the flesh of the fruit and against the half of the stone $m$ forcing it from its recess within the fruit $m'$ and through the slot $f^5$; each released half of the stone then falls between the inner sides $f^3$ and $f^4$ of the director into the chute $f^6$, which delivers them into a suitable receptacle.

During the downward movement of the cups $d^3$ above described, the arms $d^8$ move into an upper vertical position allowing the respective pawls $d^7$ to fall, the head resting (see Fig. 5) on the tube $d^2$ close to the inner side of the shoulder $d^9$ ready to engage same, as each half of the fruit leaves the sides $f^3$ and $f^4$ of the director. Upon such action taking place the respective tubes $d^2$ are immediately moved inwardly by the tension of the spring $d^4$ and in doing so the inner side of the shoulder $d^9$ comes into contact with the pawl $d^7$ (see Fig. 6) which holds the tube extended outwardly; both halves of the fruit, in the meantime, being free from engagement with sides $f^3$ and $f^4$ of the director, have fallen from the cups $d^3$ into a suitable receptacle.

As the wheels $d$ continue to rotate the respective pawls $d^7$ assume a lower or under position and by reason of their weight in comparison with the strength of the spring $d^4$ fall from engagement with the shoulder allowing the spring $d^4$ to exert its tension and move the tube $d^2$ and cup $d^3$ inwardly to a position (see Fig. 2) to again come into contact with the guide $n$ as the wheels $d$ continue to rotate.

I claim:—

1. In an apparatus of the class described, a frame, revoluble members mounted in the frame, means for imparting an intermittent movement to the said revoluble members, cup members in pairs slidably mounted upon the said revoluble members, means for separating the said cup members to receive fruit to be halved and moving the said cup members to grip the fruit, devices for halving the fruit, and means then operative for again separating the cup members to permit the fruit to drop therefrom.

2. In an apparatus of the class described, a frame, revoluble members mounted in the frame, means for imparting an intermittent movement to the said revoluble members, cup members in pairs slidably mounted upon the said revoluble members, means for separating the said cup members to receive fruit to be halved and moving the said cup members to grip the fruit, devices for halving the fruit, and means then operative for again separating the cup members and forcing the severed stone from the fruit and permitting the fruit to drop from the cup members.

3. In an apparatus of the class described, a frame, revoluble members mounted in the frame, means for imparting an intermittent movement to the said revoluble members, cup members in pairs slidably mounted upon the said revoluble members, means for separating the said cup members to receive fruit to be halved and moving the said cup members to grip the fruit, devices for halving the fruit, means for again separating the cup members, means operative when the cup members are thus separated for removing the stone from the fruit, and means for holding the cup members in a spaced position until the fruit is permitted to drop therefrom.

4. In an apparatus of the class described, a frame, spaced wheels mounted therein, means for imparting an intermittent revoluble movement to the said wheels, cup members arranged in oppositely disposed pairs on the peripheries of the said wheels, a cup member separator and fruit holder by which the cup members are separated and released to receive and grip a piece of fruit to be halved, means for halving the fruit while gripped between the cup members, devices for again separating the cup members and holding the fruit in position therein, means operative when the fruit is thus held in the cup members for removing the halved parts of the stone therefrom, and means for maintaining the cup members in a spaced position after the stones have been removed from the fruit until the parts of the fruit are permitted to drop from the cup members.

5. In an apparatus of the class described, a frame, spaced wheels mounted therein, means for imparting an intermittent revoluble movement to the said wheels, cup members arranged in oppositely disposed pairs on the peripheries of the said wheels, a cup member separator and fruit holder by which the cup members are separated and released to receive and grip a piece of fruit to be halved, means for halving the fruit while gripped between the cup members, a cup separator and fruit retainer member for again separating the cups and maintaining the parts of the fruit in position therein, means then operative for removing the parts of the stone from the fruit, and devices for maintaining the cup members in the separated position after they have cleared the cup separator thereby permitting the fruit to drop from the cup members.

6. In an apparatus of the class described, a frame, spaced wheels mounted therein, means for imparting an intermittent revoluble movement to the said wheels, cup members arranged in oppositely disposed pairs on the peripheries of the said wheels, a cup member separator and fruit holder by which the cup members are separated and released to receive and grip a piece of fruit to be halved, means for halving the fruit while gripped between the cup members, a cup separator and fruit retainer member for again separating the cups and maintaining the parts of the fruit in position therein, shiftable rods operating within the said cup members, means for actuating the said rods to force the parts of the stone from the fruit while the cups are held in a spaced position by the said cup separator, and means for retaining the cup members in a spaced position after they have cleared the said cup separator to permit the parts of the fruit to drop therefrom.

7. In an apparatus of the class described, a frame, spaced wheels mounted therein, means for imparting an intermittent revoluble movement to the said wheels, cup members arranged in oppositely disposed pairs on the peripheries of the said wheels, a cup member separator and fruit holder by which the cup members are separated and released to receive and grip a piece of fruit to be halved, means for halving the fruit while gripped between the cup members, a cup separator and fruit retainer member for again separating the cups and maintaining the parts of the fruit in position therein, shiftable rods operating within the said cup members, means for actuating the said rods to force the parts of the stone from the fruit while the cups are held in a spaced position by the said cup separator, and automatically operated latch lever devices for maintaining the said cup members in a spaced position for a predetermined period after the cup members have cleared the said cup separator to permit the halves of the fruit to drop from the cup members.

In testimony whereof I have signed my name to this specification in the presence of two subscribing witnesses.

FRANK ROBBINS.

Witnesses:
　AUGUSTINE THOMAS WADDEN,
　FLORENCE SINCLAIR.